UNITED STATES PATENT OFFICE.

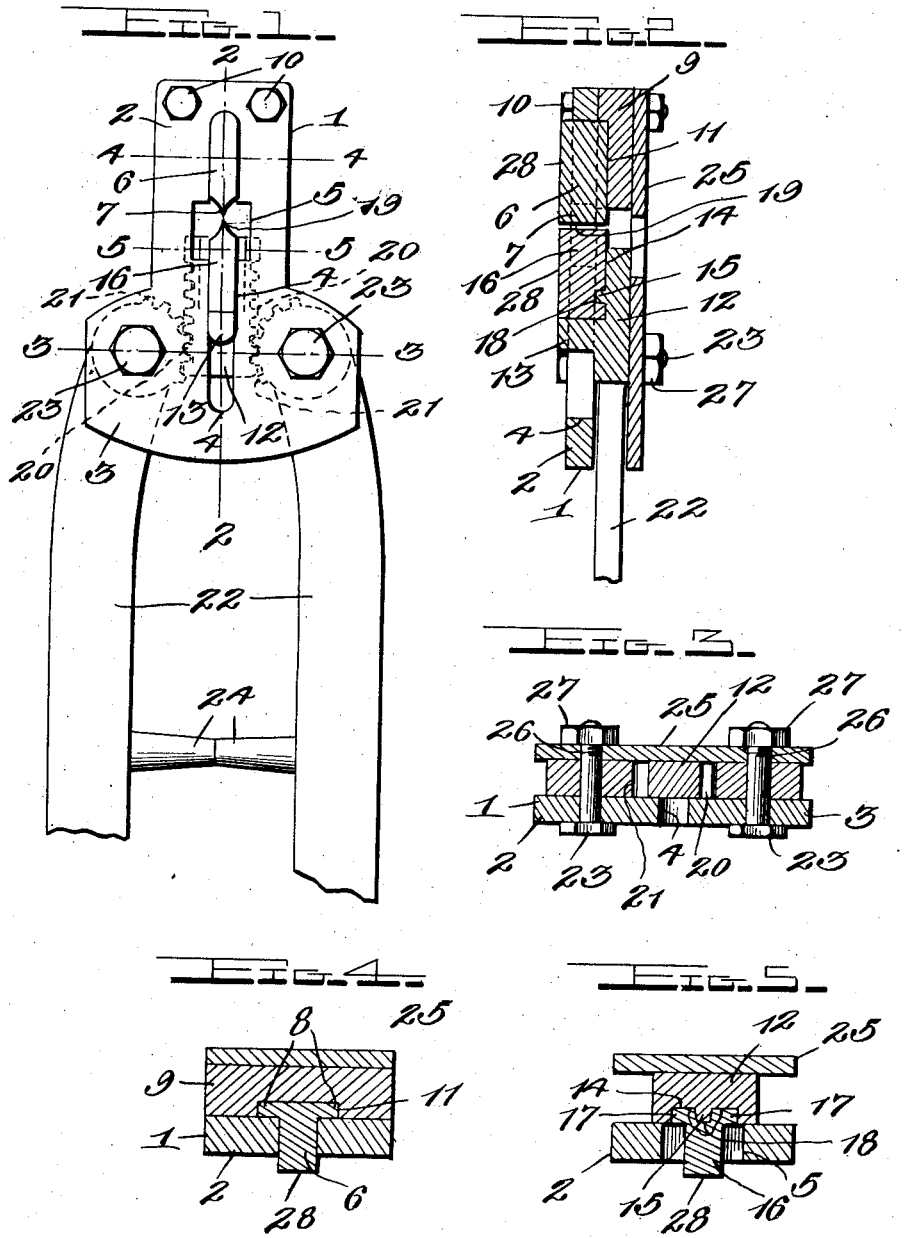

PHILIP NELSON, OF WATROUS, NEW MEXICO.

NUT-SPLITTER.

1,037,968.   Specification of Letters Patent.   Patented Sept. 10, 1912.

Application filed May 11, 1912.  Serial No. 696,693.

*To all whom it may concern:*

Be it known that I, PHILIP NELSON, a citizen of the United States, residing at Watrous, in the county of Mora and State of New Mexico, have invented certain new and useful Improvements in Nut-Splitters, of which the following is a specification, reference being had to the accompanying drawings.

This invention relates to new and useful improvements in nut splitters, the primary object of the invention being to provide a splitter which will quickly cut a nut from a bolt where it is impossible to remove the nut with a wrench without in any manner destroying the bolt.

Another object of the invention is to provide a device of this character which will possess advantages in points of efficiency and durability, is inexpensive to manufacture and at the same time is simple in construction and operation.

With the above and other objects in view the invention consists in the novel features of construction and the combination and arrangement of parts hereinafter more fully described, pointed out in the claims, and shown in the accompanying drawings, in which—

Figure 1 is an elevation of my improved nut splitter. Fig. 2 is a sectional view on the line 2—2 of Fig. 1. Fig. 3 is a sectional view on the line 3—3 of Fig. 1. Fig. 4, is a sectional view on the line 4—4, of Fig. 1. Fig. 5 is a sectional view on the line 5—5 of Fig. 1.

Referring more particularly to the drawings, 1 indicates the casing which comprises the body plate 2 which is provided at one end with a transverse enlarged portion 3, and is further provided with a longitudinal slot 4 having an enlarged central portion 5. Mounted in the lower end of the slot 4 is the stationary cutting member 6, which is provided at one end with a hollow ground cutting blade 7. Outwardly extending flanges 8 are formed upon the longitudinal edges of the member 6 and adapted to rest upon the base plate to prevent the removal of the cutting member. A guide plate 9 is mounted upon the lower end of the body plate 1 and is held securely in position by means of the bolts 10, said guide plate being provided with a longitudinal recess 11, adapted to receive the flanges 8 formed on the cutting member 6 so that the cutting member will be securely held against any relative lateral movement.

A rack bar 12 is slidably mounted upon the base plate 1 and is provided with an outwardly extending lug 13 upon one side thereof which is disposed in the slot 4 to guide the rack and at the same time hold the rack against lateral movement. A longitudinal recess 14 is formed in the lower end of the rack 12 and a stud 15 is arranged in said recess having its outer end flush with the side edges of the rack bar. A reciprocating cutter member 16 is provided having flanges 17 formed upon its longitudinal edges and provided at one end with an opening 18 to receive the stud 15 upon the rack bar. Thus it will be seen that the cutter member 16 is slidably mounted in the upper end of the slot 4 so as to prevent any lateral movement. The cutting member 16 is provided at its lower end with the hollow ground cutting edge 19 which is arranged in alinement with the cutting edge 7 on the member 6.

The rack bar 12 is provided upon its side edes with a plurality of teeth 20 which are adapted to be engaged by oppositely disposed toothed sectors 21 carried by the front edge of the handles 22 and are pivotally mounted upon the ends of the transverse enlarged portion 3 by means of the bolts 23. The handles 22 are provided adjacent their inner ends with stops 24 which limit the inward motion of the handles.

A cover plate 25 is provided which is of substantially the same form as the body plate and is provided with the openings 26, adapted to receive the ends of the bolts 10 and 23 so that the plate 25 may be securely held by means of the nuts 27.

From the above description it will be readily seen that the operating parts are arranged between the body plate 1 and the cover plate 25. In reciprocating the bar 12 which carries the cutter member 16, the handles 22 are moved outwardly and inwardly in the arc of a circle. Thus it will be seen that a nut placed between the cutting edges 7 and 19 will be quickly and readily split in two by actuating the handles 22 to remove the nut from the bolt. It will be readily seen that the cutting edges project beyond the outer face of the base plate as shown at 28 so that a nut which is partly embedded in the wood can be readily grasped and split more quickly than if the cutting edges were flush with the outer face of the plate 1.

In using my improved nut splitter the nut is first arranged in the enlarged portion 5 of the slot 4 so that it will be directly between the cutting edges 7 and 19, the handles 22 are then brought together which will force the cutting edge 19 downward into one of the longitudinal edges of the nut and at the same time it will force the other side of the nut downwardly upon the cutting edge 7 so that the cutting edge 7 will split that side of the nut.

From the above description taken in connection with the drawings it will be readily seen that I have provided a nut splitter whereby a nut can be quickly and easily cut from a bolt without destroying the bolt in any manner, and that I have also provided a nut splitting tool which is extremely simple and durable and that can be manufactured at a very low cost.

While I have shown and described the preferred form of my invention it will be obvious that various changes in the details of construction and in the proportions may be resorted to for successfully carrying my invention into practice without sacrificing any of the novel features or departing from the scope thereof.

What I claim is:—

1. In a device of the character described, the combination of a base plate having at one end a transversely extending enlarged portion, said plate being provided with a longitudinal recess having a central enlarged portion, a cutting member arranged in the lower end of the recess, flanges formed upon the longitudinal edges of said cutting member and resting upon the base plate, a guide plate provided with a longitudinal recess to receive said flanges, a rack bar having an outward extending lug slidably mounted in the upper end of the slot, said rack bar having a longitudinal recess extending inward from one end, a stud arranged in the recess, a cutting member having flanges formed upon its longitudinal edges and disposed in said recess, said cutting blade having an opening to receive said stud, and manually operating means adapted to engage the rack bar to reciprocate the second cutting member.

2. In a device of the character described, the combination of a base plate, said base plate being provided with a longitudinal opening having a central enlargement, a cutting member arranged in one end of the slot and extending outwardly beyond the face of the base plate, flanges formed upon the longitudinal edges of the cutting member and engaging the inner face of the base plate, a guide plate having a longitudinal recess to receive said flanges, a rack bar, an outward extending lug formed on said rack bar and slidably mounted in the upper end of the slot, said rack bar having a longitudinal recess extending inward from one end thereof, a stud arranged in said recess at the inner end thereof, a second cutting member, having flanges formed upon its longitudinal edges and arranged within said recess, said cutting member having an opening formed therein to receive the stud in the recess, said cutting member being slidably mounted in the slot and extending outwardly beyond the outer face of the base plate, cutting edges formed upon the opposed ends of the cutting members, and manually operating means engaging with the rack bar to reciprocate the second cutting member.

In testimony whereof I hereunto affix my signature in the presence of two witnesses.

PHILIP NELSON.

Witnesses:
  HESTER M. KEARNEY,
  F. H. DORLIN.

Copies of this patent may be obtained for five cents each, by addressing the "Commissioner of Patents, Washington, D. C."